United States Patent [19]
De Rooij

[11] 3,820,972
[45] June 28, 1974

[54] SEPARATION OF LACTAMS FROM A MEDIUM COATING CONCENTRATED SULPHURIC TRIOXIDE IN COMBINATION WITH THE PREPARATION OF PHOSPHATE FERTILIZERS

[75] Inventor: Abraham H. De Rooij, Geleen, Netherlands

[73] Assignee: Stamicarbon N.V., Heerlen, Netherlands

[22] Filed: May 2, 1972

[21] Appl. No.: 249,728

[30] Foreign Application Priority Data
May 7, 1971  Netherlands...................... 7106342
May 7, 1971  Netherlands...................... 7106344

[52] U.S. Cl.............................. 71/37, 260/239.3 A
[51] Int. Cl............................................. C05b 11/08
[58] Field of Search.................. 260/239.3 A; 71/37

[56] References Cited
UNITED STATES PATENTS

| | | | |
|---|---|---|---|
| 1,758,448 | 5/1930 | Lilgenroth | 71/39 X |
| 2,423,200 | 7/1947 | Moncrieff et al. | 260/239.3 A |
| 2,942,967 | 6/1960 | Caldwell | 71/39 |
| 3,241,944 | 3/1966 | Takeda et al. | 71/37 |
| 3,264,060 | 8/1966 | Nieswardt et al. | 260/239.3 A |
| 3,336,298 | 8/1967 | De Rosij et al. | 260/239.3 A |
| 3,429,680 | 2/1969 | Dingeines | 71/37 |
| 3,484,434 | 12/1969 | Norell | 260/239.3 A |
| 3,653,872 | 4/1972 | Guers | 71/37 |
| 3,694,433 | 9/1972 | Beckhum | 260/239.3 A |
| 3,718,453 | 2/1973 | Thompson | 71/37 |

Primary Examiner—Charles N. Hart
Assistant Examiner—Ferris Lander
Attorney, Agent, or Firm—Cushman, Darby & Cushman

[57] ABSTRACT

A process for the recovery of lactams from a Beckmann rearrangement mixture of lactams and sulphuric acid or sulphur trioxide, with the production of a phosphate-containing fertilizer is disclosed. The Beckmann rearrangement mixture is partially neutralized by the addition of ammonium or alkali metal hydroxide, sulphate or carbonate in an amount such that the molar ratio between the sulphate formed and the sum of the sulphate formed and the free sulphuric acid is at least 1/8:1. Thereafter, the resulting partially neutralized solution is extracted by a substantially water-immiscible, organic lactam solvent to separate lactam from the remainder of said mixture, and the remainder of said mixture after such extraction is used for the decomposition of rock phosphate with formation of gypsum and of a free phosphoric acid-containing solution. This latter solution, after removal of gypsum and neutralization of the solution with ammonia or alkali liquor is converted into a dihydrogen phosphate-containing solution from which dihydrogen phosphate, suitable for use in fertilizers, is recovered after evaporative concentration.

The process provides for the ready separation of lactams from a Beckmann rearrangement reaction mixture, while at the same time producing, as a by-product, dihydrogen phosphate or a valuable dihydrogen phosphate containing fertilizer.

13 Claims, 2 Drawing Figures

SEPARATION OF LACTAMS FROM A MEDIUM COATING CONCENTRATED SULPHURIC TRIOXIDE IN COMBINATION WITH THE PREPARATION OF PHOSPHATE FERTILIZERS

BACKGROUND OF THE INVENTION

The present invention relates to the preparation of lactams in a medium containing concentrated sulphuric acid, or $SO_3$, and the preparation of phosphate fertilizers from by-products of the lactam preparation process.

It is well known in the art that lactams can be obtained by the intramolecular rearrangement of alicyclic oximes, which intramolecular rearrangement is commonly known as the Beckmann rearrangement. This rearrangement is normally conducted in the presence of oleum or sulphur trioxide.

The production of $\epsilon$-caprolactam from the Beckmann rearrangement of dry cyclohexanone oxime is normally conducted in oleum containing about 6 percent by weight of free $SO_3$ at a temperature of about 125°C. $\epsilon$-caprolactam is the most important of the lactams commercially produced, being used, for instance, as a monomer for nylon 6.

The prior art has also prepared lactams by subjecting compounds having a cycloalkyl nucleus and containing a tertiary carbon atom to a nitrosation process in concentrated sulphuric acid.

In both of these prior art processes, however, the resulting lactam, which is a very weak organic nitrogen base, will be found in the resulting reaction mixture in a conjugated acid form, e.g. lactam bisulphate.

To enable the lactam to be separated from the acidic reaction mixture, the prior art normally lowers the acidity of the reaction mixture (or raises the pH value of such mixture) to a pH of about 4.5 by the addition of ammonia water, with the result that the lactam changes from the conjugated acid form into the free base, which floats on the resulting ammonium sulphate solution as a concentrated solution of lactam and water. After this pH adjustment, with the formation of a separate lactam phase, the lactam is normally separated from the ammonium sulphate solution.

The above process, which has been widely used by the prior art, has the distinct disadvantage that all of the sulphuric acid and sulphur trioxide used in the lactam conversion is recovered as ammonium sulphate. In the conversion of cyclohexanone oxime with oleum containing 6 percent by weight of free $SO_3$ to form $\epsilon$-caprolactam, about 1.8 tons of ammonium sulphate will be formed per ton of lactam. The market for ammonium sulphate is already flooded, and consequently ammonium sulphate commands only a very low price in the fertilizer market. For this reason, and also because of the high cost of transporting ammonium sulphate from the production area to use areas, the production of ammonium sulphate by-product must be economically considered undesirable, and even unacceptable in the long run.

U.S. Pat. No. 2,737,511 proposes to omit the neutralization of the sulphuric acid or the oleum to form ammonium sulphate after the conversion of the oxime into the lactam, and to extract the lactam directly from the acid reaction mixture, which has been diluted with water, with a water-immiscible organic solvent, such as chloroform, or to conduct such extraction with an organic solvent such as liquid $SO_2$. The resulting sulphuric acid solution, which contains no lactam, could then be concentrated and again used for the conversion of oxime into lactam.

This proposed process has serious disadvantages in recycling the sulphuric acid for the oxime conversion, not only in that the diluted acid recovered after lactam extraction must be concentrated, but also in that by-products which are formed in the oxime conversion will mass in the recycled sulphuric stream, so that in time this recycled sulphuric acid stream will be unsuitable for the conversion of oximes into lactams of sufficient quality.

U.S. Pat. No. 3,336,298 and Netherlands Patent application No. 6,402,370 (which has been laid open for public inspection) suggest an alternative approach which is aimed at both keeping the free sulphuric acid used in the Beckmann rearrangement of oximes into lactam in that form, while, at the same time, breaking or at least weakening the bond between the sulphuric acid and the lactam, to render the lactam extraction possible. This proposal involves the addition of ammonium sulphate to the Beckmann rearrangement reaction mixture in such an amount that ammonium hydrogen sulphate will be formed from the sulphuric acid in the reaction mixture and the added ammonium sulphate. After the lactam has been extracted with a suitable extracting agent, such as, for instance, benzene, a concentrated solution of ammonium hydrogen sulphate will be obtained, with the above patent and patent application suggesting that the acid properties of this solution be utilized for the decomposition of phosphate rock. However, in such a process the acid properties of the ammonium hydrogen sulphate solution are too weak to result in the effective decomposition of rock phosphate, and generally the decomposition will have to be effected with the ammonium hydrogen sulphate solution being combined with a stronger acid such as phosphoric acid and/or nitric acid.

DESCRIPTION OF THE INVENTION

The process of the present invention is directed to a method for separating lactams from a reaction medium containing sulphuric acid or sulphur trioxide, combined with the subsequent decomposition of rock phosphate to produce a phosphate-containing product wherein the phosphate component is virtually completely water-soluble, such as ammonium dihydrogen phosphate, alkali metal dihydrogen phosphate, or a nitrophosphate fertilizer.

In the process of the present invention, part of the ammonia or alkali metal required for the preparation of the ammonium dihydrogen phosphate, alkali metal dihydrogen phosphate or nitrophosphate fertilizer is first utilized to at least partly neutralize a Beckmann rearrangement reaction mixture containing lactam or sulphuric acid or oleum. Thereafter, the lactam is extracted from the at least partly neutralized rearrangement reaction mixture, which is rendered suitable for such extraction by the neutralization step. The sulphuric acid solution remaining after the extraction step, which solution also contains ammonium — or alkali metal — sulphate, is utilized for the decomposition of rock phosphate into phosphoric acid from which the desired ammonium dihydrogen phosphate or alkali metal dihydrogen phosphate can be recovered after a subsequent neutralization. If nitric acid is used in conjunction with the aforesaid sulfuric acid solution for the decomposition of rock phosphate, a nitrophosphate fertilizer containing ammonium- or alkalimetaldihydrogenphosphate can be recoverd after the subsequent neutralization.

If the desired product from the rock phosphate decomposition is an alkali metal dihydrogen phosphate or ammonium dihydrogen phosphate, the degree of acidity of the sulfuric acid solution remaining after the lactam extraction must be a balance between sufficient acidity to insure decomposition of the rock phosphate without requiring substantial addition of extra acid, and a reduced acidity such that the lactam can be readily and economically extracted from the partially neutralized sulfuric acid solution. These requirements are both satisfied in the process of the present invention if the mixture containing lactam and sulphuric acid which is to be subjected to lactam extraction is adjusted, by the addition of ammonium or alkali metal hydroxides, carbonates or sulphates, such as sodium hydroxide, potassium carbonate, ammonium sulphate, ammonium hydroxide, and the like, to a molar ratio of ammonium sulphate and/or alkali metal sulphate to the sum of ammonium sulphate and/or alkali metal sulphate and free sulphuric acid of between a minimum of 1/8:1 and a maximum of 1/5:1.

On the other hand, however, if the rock phosphate is to be converted into a nitrophosphate fertilizer, the mixture of lactam and sulphuric acid or oleum which is to be subjected to lactam extraction should contain considerably more ammonium sulphate or alkali metal sulphate, and it is preferred that the molar ratio of ammonium sulphate and/or alkali metal sulphate to the sum of ammonium sulphate and/or alkali metal sulphate and free sulphuric acid be between a minimum of 1/5:1 up to about 0.5:1 or even higher. Preferably, the Beckmann rearrangement reaction mixture which is to be subjected to lactam extraction contains about equimolecular amounts of ammonium sulphate and/or alkali metal sulphate and free sulphuric acid.

The extracting agents for the lactam extraction from the Beckmann rearrangement reaction mixture of lactams and sulphuric acid or oleum are generally water-immiscible organic lactam solvents, such as benzene, cyclohexane, heptane, halogenated hydrocarbons of one to three carbon atoms, such as chloroform and 1,1,2,2 tetrachloroethane and nitrohydrocarbons such as nitrobenzene and nitrocyclohexane, dioxane, and ethers, and nitriles of two to three carbon atoms, such as acetonitrile and acrylonitrile, although non-organic solvents, such as liquid sulphur dioxide, can also be used. Generally, these extraction solvents will be used to extract lactam from neutralized or nearly neutralized solutions of lactam or sulphuric acid or oleum. Chloroform is decidedly preferred as the extracting agent or solvent, in view of its high extraction efficiency and low boiling point, while 1,1,2,2-tetrachloroethane also results in high extraction efficiencies.

Generally, the temperature during the extraction and neutralization steps will be maintained at a relatively low level, generally below 40 °C, with the extraction preferably conducted below 30 °C, in order to avoid or minimize the hydrolysis of the lactam, such as, for instance, the hydrolysis of $\epsilon$-caprolactam to $\epsilon$-aminocaproic acid, during the lactam extraction from the Beckmann rearrangement reaction mixture. Such hydrolysis can also be reduced or prevented by having the extraction agent present during the neutralization step.

One embodiment of the process of the present invention involves extracting lactam from a mixture of lactam and sulphuric acid by means of an organic solvent for the lactam in the prsence of ammonium sulphate or alkali metal sulphate and free sulphuric acid, with the subsequent decomposition of rock phosphate by the sulphuric acid solution remaining after lactam extraction. This sulphuric acid solution may be used directly for the rock phosphate decomposition, but this has the disadvantage that precipitation of gypsum takes place simultaneously with the rock phosphate decomposition, with the possibility of rock phosphate particles being encapsulated by the gypsum and thereby being lost.

The more preferred embodiment, having improved rock phosphate decomposition efficiency, involves the indirect use of the sulphuric acid solution for the rock phosphate decomposition. The gypsum is first caused to precipitate, with the aid of the sulphuric acid solution, from a previously obtained rock phosphate decomposition mass, with resulting formation of free phosphoric acid. Thereafter, the rock phosphate is dissolved by the free phosphoric acid solution to produce the aforesaid decomposition mass.

In the preparation of a nitrophosphate fertilizer having a N to $P_2O_5$ weight ratio of 1:1, a solution containing free phosphoric acid and ammonium nitrate is recycled to the phosphate rock decomposition reactor, while rock phosphate, nitric acid, and an aqueous ammonium hydrogen sulphate solution containing no lactam, obtained by a previous extraction process, are added to the recycled liquid in such amounts that, after the addition of the ammonium hydrogen sulphate solution and precipitation of calcium ions with simultaneous formation of gypsum, a solution is obtained which will contain about 2 moles of ammonium nitrate per mole of phosphoric acid, according to the following reaction equation (assuming that rock phosphate can be represented by the formula $CaO \cdot Ca_3(PO_4)_2$):

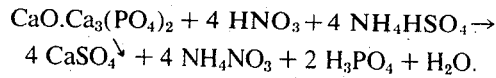

Part of the solution obtained after separation of gypsum is continuously withdrawn from the system for further processing into fertilizer. The reactions which occur in the rock phosphate decomposition and following operations can be represented, assuming that the recycled stream contains X moles of $H_3PO_4$ and 2X moles of $NH_4NO_3$ prior to the addition of rock phosphate and nitric acid, by the following equations:

Decomposition of phosphate rock:

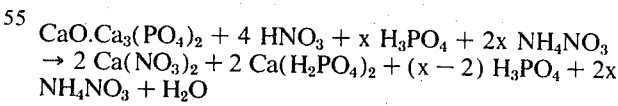

Formation of gypsum with liberation of phosphoric acid:

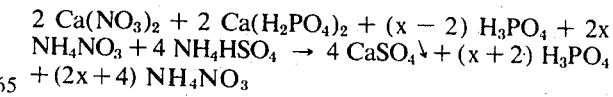

Withdrawal of $2\ H_3PO_4 + 4\ NH_4NO_3$ from the recycle flow for further processing $$2 H_3PO_4 + 4 NH_4NO_3 + 2 NH_3 \rightarrow 2 NH_4H_2PO_4 + 4 NH_4NO_3$$

As indicated previously, the above nitrophosphate fertilizer will have a N-P$_2$O$_5$ weight ratio of 1:1. Mixing the product withdrawn from the recycled flow and neutralized with ammonia with three moles of KCl produces a NPK fertilizer having a weight ratio of N:P$_2$O$_5$:K$_2$O of 1:1:1.

It is clear that the process described hereinabove may be modified in a number of areas without departing from the scope of the present invention, as long as the lactam is separated from the lactam and sulphuric acid mixture by extraction or other separation, with formation of an ammonium hydrogen sulphate solution which contains essentially no lactam, which solution is used to decompose rock phosphate. For instance, it is possible to replace the aqueous ammonia solution fed to mixing vessel A (described hereinafter) by a solution of ammonium sulphate fed in such an amount that mixing thereof with the lactam-sulphuric acid mixture will result in the formation of an aqueous solution of lactam and ammonium hydrogen sulphate. It is preferred, however, to partially neutralize the Beckmann rearrangement reaction mixture acidity with ammonia water, as the resulting solutions which must be extracted will then be more concentrated, with the result that less water must be later evaporated in the preparation of the nitrophosphate fertilizer.

The solution formed in the mixing vessel A, prior to the extraction of the lactam, does not have to have, besides water and lactam, a composition exactly of ammonium hydrogen sulphate. That is, the molar ratio of ammonium sulphate to free sulphuric acid in such solution need not be exactly 1:1. An adequate extraction of the lactam can be obtained if only ¼, instead of ½, of the sulphuric acid originally contained in the mixture of lactam and sulphuric acid is neutralized, that is, the molar ratio of ammonium sulphate to free sulphuric acid may be only 1:3, while higher degrees of neutralization, whereby the solution contains ammonium sulphate in addition to ammonium hydrogen sulphate, will not interfere with lactam extraction. However, lowering the acidity of the mixture of lactam and sulphuric acid much above or below the point of formation of ammonium hydrogen sulphate does effect the composition of the final NP or NPK mixed fertilizer produced. An NP or NPK fertilizer having an N-P$_2$O$_5$ weight ratio of about 1:1 is highly desirable as a fertilizer, and to prepare a fertilizer having this N-P$_2$O$_5$ weight ratio, it is necessary that the molar ratio of (NH$_4$)$_2$SO$_4$ to free sulphuric acid in the lactam solution which is to be extracted be within the range of 0.9:1 to 1.1:1.

The process of the present invention represents a distinct advantage in that the acid which is required for the Beckmann rearrangement is used in an economical manner in the decomposition of rock phosphate, and also the process of the present invention provides a simple way of manufacturing either nitrophosphate mixed fertilizers, especially those wherein the N:P$_2$O$_5$ weight ratio is about 1:1, or monoamonium phosphate or monoalkali metal phosphates.

DESCRIPTION OF THE DRAWINGS

The invention will be more readily understood by reference to the accompanying drawings wherein:

The flow diagram of FIG. 1 represents a continuous process for preparing ammonium hydrogen phosphate according to the present invention, wherein rock phosphate is indirectly decomposed with the sulphuric acid solution remaining after lactam extraction of a Beckmann rearrangement reaction mixture. In FIG. 1, mixing vessel A is supplied with a mixture of lactam and sulphuric acid from a Beckmann rearrangement process through line 1a in such proportions that, in the solution of lactam in an ammonium sulphate and sulphuric acid medium which is obtained, the molar ratio of $$(NH_4)_2SO_4/(NH_4)_2SO_4 + H_2SO_4$$

Figure 1:
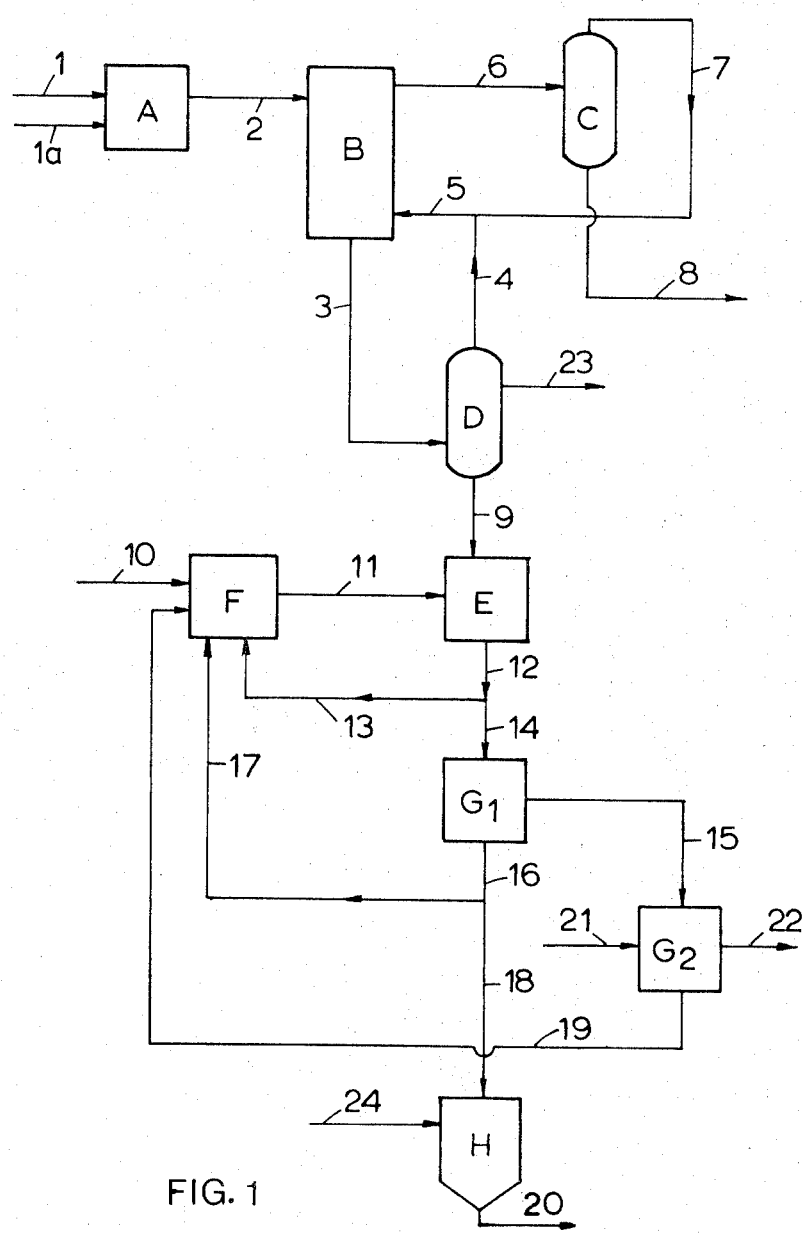
FIG. 1 represents a schematic flow diagram of a process for recoverying lactam and preparing ammonium dihydrogen phosphate fertilizer and FIG. 2 represents a schematic flow diagram of a process for recovering lactam and preparing nitrophosphate fertilizer.

is ⅛ to 1/5:1. The temperature in mixing vessel A will generally be within the range of 10° to 50°C, preferably 20° to 40°C, and normally the vessel will be at atmospheric pressure, although higher and lower pressures can be used if desired. The amount of water in the ammonia water solution introduced through line 1a is not critical, as long as at least 15 moles of water per mole of sulphuric acid or SO$_3$ in the lactam-sulphuric acid mixture is present. Preferably, however, the amount of water will amount to about 19 to 23 moles per mole of sulphuric acid and/or free SO$_3$.

The mixture produced in mixing vessel A is supplied to extraction device B through line 2, wherein the mixture is extracted, preferably counter-currently, with an organic extracting agent for the lactam. The organic extracting agent for the lactam should be water immiscible, or at most only slightly miscible with water. The extraction will generally be below 40°C, and preferably between 20° and 30°C, and conveniently is conducted at atmospheric pressure, although higher and lower pressures can be used if desired. Enough extraction solvent should be used to insure complete extraction of the lactam from the mixture, and a considerable excess of the extraction solvent can be used if desired, although this generally has no particular advantage. Normally, from 14 to 18 moles of the extraction solvent will be used per mole of lactam in the mixture which is to be extracted.

From extraction device B, a solution of the extracting agent or solvent loaded with lactam is supplied to separating unit C through line 6. In separating unit C, the extracting agent and the lactam are separated by partly evaporation of the extraction agent followed by a lactam extraction with water. The evaporation takes place normally at a temperature slightly above the extraction agent boiling point, and preferably at atmospheric pressure, although reduced pressures, or even elevated pressures may be used if desired. The extraction agent or solvent so evaporated is condensed and then recycled together with the lactam free washed extraction agent or solvent to extraction device B through line 7, while product lactam is discharged from evaporator C through line 8.

An aqueous solution which is free of lactam and contains sulphuric acid and ammonium sulphate, together with minor amounts of extracting agent, is discharged from extraction device B to stripping column D via line 3. In stripping column D the organic solvent is stripped from the aqueous solution, condensed, and returned to extraction device B through lines 4 and 5, with water vapor being discharged through line 23. The stripping column D is operated at a temperature generally slightly above the boiling point of the organic solvent and is conveniently at atmospheric pressure. For some solvents, it may be advantageous to use reduced pressures, although this is not required, and it is even possible to use elevated pressures if so desired.

Decomposition reactor F is supplied with rock phosphate through line 10, and the rock, phosphate is decomposed by means of solutions containing free phosphoric acid which are supplied to the decomposition reactor F through lines 13 and 17. Rock phosphate can be approximated by the atomic formula

$$CaO \cdot Ca_3(PO_4)_2,$$

and the phosphoric acid solutions, which will be described in more detail hereinafter, will generally be supplied to decomposition reactor F in an amount corresponding to about 4 to 6 moles of phosphoric acid per mole of calcium in the rock phosphate. The decomposition reactor F is generally operated at a temperature of 50° to 80°C, preferably 55° to 65°C, and a pressure of 0.8 to 1.1 atmospheres, preferably 0.9 to 1.0 atmospheres. The resulting decomposition liquid is introduced into gypsum precipitation vessel E through line 11. Gypsum precipitation vessel E is also supplied with the aqueous solution of ammonium sulphate and free sulphuric acid, which has been discharged from stripping column D, through line 9.

The gypsum precipitation vessel E is generally operated at a temperature of 50° to 80°C and a pressure of 0.9 to 1 atmospheres. In gypsum precipitator E, at least most of the calcium in the decomposition liquid produced in decomposition reactor F is converted into gypsum and a suspension of gypsum in a phosphoric acid solution is discharged from gypsum precipitation vessel E through line 12. Part of this gypsum in phosphoric acid solution is recycled to the decomposition reactor F through line 13, with the amount of solution so recycled generally amounting to 75 to 85 percent of the solution discharged from gypsum precipitation E. The remainder of the suspension of gypsum in phosphoric acid solution proceeds through line 14 to solid-liquid separating device G-1, which may be, e.g. a filtration device or a decantation device, wherein the gypsum is separated from the phosphoric acid solution. The gypsum particles obtained in separating device G-1 are supplied to washer G-2 through line 15, and are washed with washing water supplied through line 21. Gypsum crystals are discharged from the gypsum-removal system through line 22, with the wash water and the mother liquor washed from the gypsum crystals being supplied to decomposition vessel F through line 19. A gypsum-free phosphoric acid solution is discharged through line 16, with part of such solution, generally about 60 to 70 percent by weight, recycled through line 17 to the decomposition reactor F. The remainder of the gypsum-free phosphoric acid solution is supplied to neutralization vessel H through line 18. In neutralization vessel H the solution is neutralized with $NH_3$ or with an alkali metal solution supplied through line 24, with the neutralization generally being to a pH of at least 3, preferably 3 to 4. The neutralized solution is supplied to an evaporator (not shown) through line 20, and after water has been removed by evaporation, ammonium dihydrogen phosphate or alkali metal dihydrogen phosphate, highly suitable for use as a fertilizer, is obtained.

Figure 2:
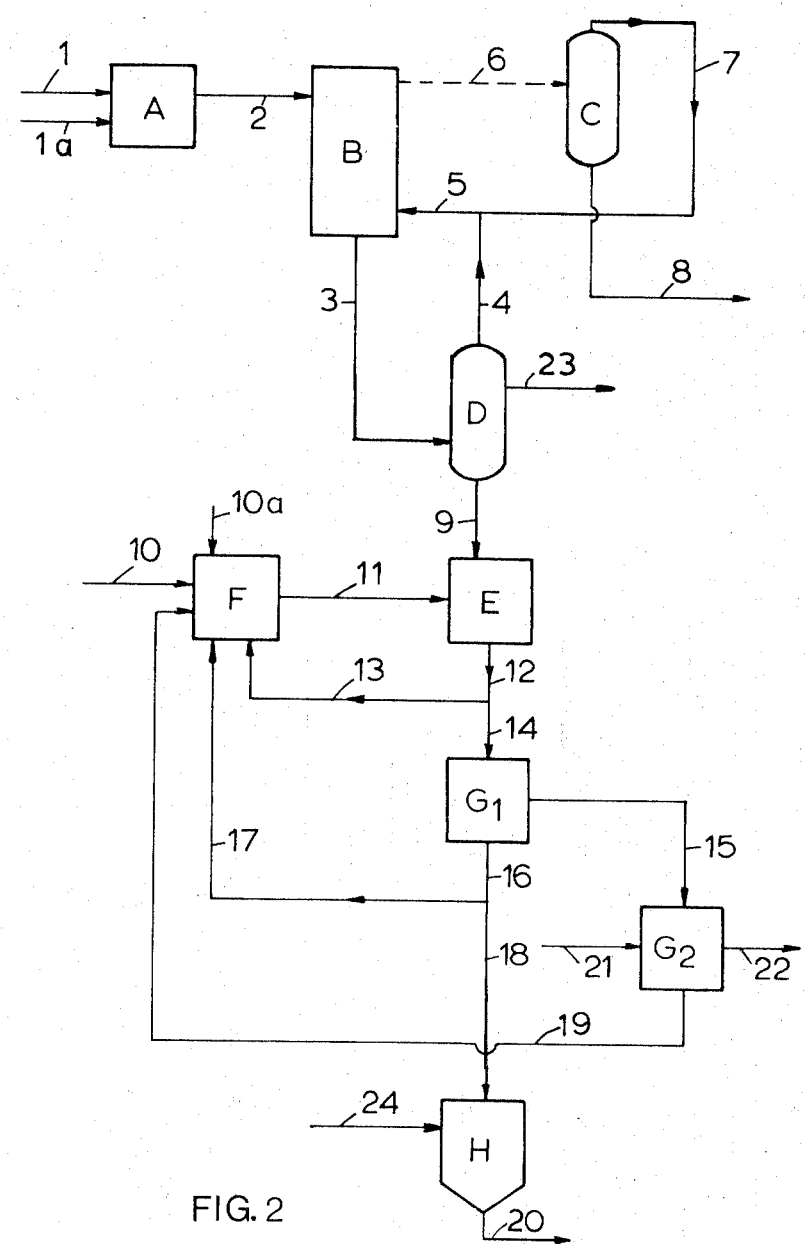

FIG. 2 represents a schematic flow diagram of another embodiment of the process of the present invention wherein phosphate rock is decomposed with nitric acid and the ammonium hydrogen sulphate solution remaining after lactam extraction from the Beckmann rearrangement reaction mixture, and the resulting product is a nitrophosphate fertilizer. In FIG. 2, mixing vessel A is supplied with a mixture of lactam and sulphuric acid from a Beckmann rearrangement through conduit 1 and with an aqueous ammonia solution through conduit 1a, in such a ratio that a solution of lactam in ammonium hydrogen sulphate is formed. The reaction conditions in mixing vessel A are generally similar to the corresponding mixing vessel of FIG. 1.

The resulting lactam/ammonium hydrogen sulphate solution flows through conduit 2 to extraction apparatus B, wherein the lactam is extracted with an organic extraction agent or solvent for the lactam, which solvent is water-immiscible, or at most only slightly water-miscible. The solvent is supplied to extraction apparatus B through conduit 5. The process conditions in extraction apparatus B are similar to those in extraction apparatus B of FIG. 1. A solution of lactam in the extraction agent is supplied to separating unit C through conduit 6, and in separating unit C the lactam and extraction agent are separated under conditions similar to the conditions in separating unit C in FIG. 1. After condensation, the evaporated extraction agent or solvent is recycled to extraction apparatus B through conduits 7 and 5, while the product lactam, which may be in solution form if desired, is discharged from the system through line 8.

An ammonium hydrogen sulphate solution which is free of lactam but still contains slight amounts of the extraction agent is discharged from extraction appratus B through line 3 to stripping column D, wherein the extraction agent is stripped from the aqueous ammonium hydrogen sulphate solution, condensed, and returned to extraction apparatus B through conduits 4 and 5. Water vapor is discharged through line 23. Stripping column D is operated under the same general conditions as stripping column D of FIG. 1.

Rock phosphate and nitric acid (preferably of about 40 to 60 percent strength) are supplied to decomposition reactor F through lines 10 and 10a, respectively. Decomposition reactor F is also supplied with solutions containing free phosphoric acid through lines 13 and 17. The process conditions in decomposition reactor F are similar to the corresponding apparatus of FIG. 1, preferably the temperature may range from 60° to 75°C. The amount of nitric acid used in the decomposition corresponds to about 0.5 to 1.5 moles per mole of phosphoric acid.

The decomposition liquor product in decomposition reactor F is introduced through line 11 into gypsum precipitator vessel E, which is also supplied through line 9 with the aqueous ammonium hydrogen sulphate solution discharged from stripping column D.

The process conditions in gypsum precipitator vessel E are similar to those of the corresponding apparatus of FIG. 1.

A suspension of gypsum in phosphoric acid solution is discharged from gypsum precipitator vessel E through line 12 with 40 to 50 percent by weight of this flow recycled to the decomposition reactor F through line 13. The remainder of the gypsum suspension in the phosphoric acid solution is supplied to separator G-1, which is similar to separator G-1 of FIG. 1 (e.g., the separator is a filter, a decanter or the like, for solid-liquid separation).

The gypsum separated from the suspension in separator G-1 is supplied to washer G-2 through line 15, and is washed in washer G-2 by wash water introduced through line 21. Gypsum crystals are discharged from the system through line 22, and the wash water, together with mother liquor washed from the gypsum crystals, is supplied to decomposition vessel F through line 19.

A phosphoric acid solution which is free of gypsum is discharged from separator G-1 through line 16, with 40 to 50 percent by weight of this solution recycled to the decomposition reactor F through conduit 17. The remainder of this phosphoric acid solution is supplied to neutralization vessel H through line 18. The solution is neutralized with $NH_3$ or alkali metal solution in neutralization vessel H, under conditions similar to those of the corresponding apparatus of FIG. 1. The neutralized solution is discharged through conduit 24 and is passed to an evaporator (not shown) to be further processed into a fertilizer.

It is preferred, in the embodiments of FIGS. 1 and 2, to neutralize the phosphoric acid solution in neutralization vessel H with ammonia or an ammonium compound. However, it will be appreciated that the solution may be neutralized with alkali metal compounds, such as hydroxides, carbonates and sulphates, including those compounds used to neutralize the Beckmann rearrangement mixture of lactam and sulphuric acid in mixing vessel A.

The process of the present invention involves an advantage not only in that the acid which is required for the Beckmann rearrangement is economically utilized to decompose rock phosphate, but also in that a simple method is provided for manufacturing either nitrophosphate mixed fertilizers, especially those nitrophosphate fertilizers wherein the $N-P_2O_5$ weight ratio is about 1:1, or ammonium dihydrogen phosphate or alkali metal dihydrogen phosphate, with all of these possible fertilizers being much more valuable than ammonium sulphate.

The lactams which are recovered from the Beckmann rearrangement reaction mixture according to the process of the present invention are generally lactams having from four to 12 carbon atoms, with ε-caprolactam being decidedly preferred. Other lactams which can be recovered by the process of the present invention include e.g. butyrolactam, valerolactam, oenantholactam and laurinolactam.

EXAMPLES OF THE INVENTION

The invention will be understood more readily by reference to the following examples; however, these examples are intended to illustrate the invention and are not to be construed to limit the scope of the invention.

EXAMPLE 1

This example relates to the process depicted schematically in FIG. 1 of the accompanying drawings, and reference to process apparatus will be to the apparatus of FIG. 1.

A mixture of lactam and sulphuric acid, containing 100 moles of ε-caprolactam and 150 moles of sulphuric acid, produced by a Beckmann rearrangement, was mixed with ammonia water containing 40.5 moles of $NH_3$ and 3300 moles of water in mixing vessel A at a temperature of 30°C. The resulting mixture was countercurrently extracted with 1580 moles of chloroform in extractor B at a temperature of 30°C and atmospheric pressure. Chloroform was stripped from the resulting ammonium sulphate/sulphuric acid solution at a temperature of about 110°C and a pressure of 1 atm in stripping column D. The mixture of chloroform and lactam from extractor B was separated in separating unit C after a previous neutralization of the solution by evaporation of the greater part of the chloroform by atmospheric pressure at 120°C, followed by an extraction of the remaining concentrated solution of lactam in chloroform with water. Rock phosphosphate was decomposed in decomposition reactor F at a temperature of 65°C and a pressure of 1 atm. The resulting decomposition mass was mixed with the ammonium sulphate/sulphuric acid solution from stripping column D in gypsum precipitator E, which was operated at a temperature of 70°C and a pressure of 1 atm.. The gypsum was separated from a phosphoric acid solution in separator G-1 by filtration. The phosphoric acid solution was neutralized in neutralization vessel H with $NH_3$, with the temperature maintained at 110°C, and atmospheric pressure.

The ammonium sulphate/sulphuric acid solution produced in stripping column D and used to precipitate gypsum in gypsum precipitator E had a molar ratio of ammonium sulphate to the sum of ammonium sulphate and free sulphuric acid of 1:7.4.

Rock phosphate containing 150 moles of CaO and 40.5 moles of $P_2O_5$ was decomposed in decomposition reactor F, and eventually a gypsum slurry was discharged from the process containing 150 moles of gypsum in 780 moles of water, part of the water being bound in the form of a hydrate and part being in the unbound condition. A solution which contained ammonium dihydrogen phosphate and phosphoric acid was produced after gypsum separation in separator G-1, and fed to neutralization vessel H, and this solution contained 40.5 moles of $H_3PO_4$,
40.5 moles of $NH_4H_2PO_4$, and
590 moles of $H_2O$.

This solution was neutralized with 40.5 moles of $NH_3$ to produce a solution of ammonium dihydrogen phosphate containing 81 moles of ammonium dihydrogen phosphate and 590 moles of water. The water was evaporated to produce solid ammonium dihydrogen phosphate, suitable for use as a fertilizer.

Table I below sets forth the composition of the various process streams of this example, with the reference numbers of the process flows corresponding to the process streams of FIG. 1.

TABLE 1

| No. | CaO | P₂O₅ | H₂SO₄ | CaSO₄ | Ca(H₂PO₄)₂ | (NH₄)₂SO₄ | H₃PO₄ | NH₄H₂PO₄ | NH₃ | capro-lactam | CHCl₃ | H₂O |
|---|---|---|---|---|---|---|---|---|---|---|---|---|
| 1 | | | 150 | | | | | | | 100 | | |
| 1a | | | | | | | | | 40.5 | | | 3300 |
| 2 | | | 129.75 | | | 20.25 | | | | 100 | | 3300 |
| 3 | | | 129.75 | | | 20.25 | | | | | | 3300 |
| 5 | | | | | | | | | | | 1580 | |
| 6 | | | | | | | | | | 100 | 1580 | |
| 8 | | | | | | | | | | 100 | | |
| 9 | | | 129.75 | | | 20.25 | | | | | | 202 |
| 10 | 150 | 40.5 | | | | | | | | | | |
| 11 | | | | 623 | 150 | | 581 | 800 | | | | 13544 |
| 12 | | | | 773 | | | 840.5 | 840.5 | | | | 13746 |
| 13 | | | | 623 | | | 677.5 | 677.5 | | | | 11076 |
| 14 | | | | 150 | | | 163 | 163 | | | | 2670 |
| 15 | | | | 150 | | | 46.5 | 46.5 | | | | 975 |
| 16 | | | | | | | 116.5 | 116.5 | | | | 1695 |
| 17 | | | | | | | 76 | 76 | | | | 1105 |
| 18 | | | | | | | 40.5 | 40.5 | | | | 590 |
| 19 | | | | | | | 46.5 | 46.5 | | | | 1335 |
| 20 | | | | | | | | 81 | | | | 590 |
| 21 | | | | | | | | | | | | 1140 |
| 22 | | | | 150 | | | | | | | | 780 |
| 23 | | | | | | | | | | | | 3098 |
| 24 | | | | | | | | | 40.5 | | | |

EXAMPLE 2

This example relates to the preparation of a nitrophosphate fertilizer at a N₂ to P₂O₅ weight ratio or 1:1, produced by a process schematically represented in FIG. 2 of the accompanying drawings.

The Beckmann rearrangement reaction mixture separated in this process contained 100 moles of ε-caprolactam and 150 moles of sulphuric acid. This mixture was mixed with ammonia water, containing 150 moles of NH₃ and 958 moles of H₂O, in mixing vessel A at a temperature of 35°C and atmospheric pressure. Then the lactam was countercurrently extracted from the resulting mixture with 288 moles of chloroform in extractor B, which was operated at a temperature of 30°C and a pressure of 1 atm. The solution of lactam in chloroform was separated in separating unit C by evaporation and water washing with 100 moles of product ε-caprolactam recovered as an aqueous solution. Residual amounts of chloroform in the ammonium sulphate/sulphuric acid solution from extractor B was stripped from the solution in stripping column D, operated at a temperature of about 110°C and a pressure of 1 atm.

Rock phosphate containing 150 moles of CaO and 40.5 moles of P₂O₅ was decomposed in decomposition reactor F at a temperature of 75°C and a pressure of 1 atm. The resulting decomposition mass was treated with the ammonium sulphate/sulphuric acid solution from stripping column D in gypsum precipitator E to precipitate the gypsum. The precipitated gypsum was separated from the phosphoric acid solution in separator G-1 by filtration, and after washing in washer G-2, a gypsum slurry of 150 moles of gypsum and 780 moles of water (both free water and combined water of hydration) was discharged from the system. After gypsum separation in separator G-1, a solution containing 81 moles of H₃PO₄;
150 moles of NH₄NO₃;
1572 moles of H₂O was fed to neutralization vessel H. In neutralization vessel H, the solution was neutralized with 81 moles of NH₃, to produce an ammonium dihydrogen phosphate/ammonium nitrate solution. This solution was concentrated by dryness by evaporation, mixed with 121 moles of KCl, and then granulated to produce an NPK fertilizer of the 17:17:17 type.

The compositions of the process flows of this example are shown in Table II below, wherein the reference figures refer to the corresponding process streams of FIG. 2.

TABLE II—Continued

| No. | CaO | P₂O₅ | H₂SO₄ | CaSO₄ | NH₄HSO₄ | H₃PO₄ | NH₄H₂PO₄ | HNO₃ | NH₃ | capro-lactam | CHCl₃ | H₂O |
|---|---|---|---|---|---|---|---|---|---|---|---|---|
| 1 | | | 150 | | | | | | | 100 | | |
| 1a | | | | | | | | | 150 | | | 958 |
| 2 | | | | 150 | | | | | | 100 | | 958 |
| 3 | | | | | | | | | | | | |
| 5 | | | | | | | | | | | 288 | |
| 6 | | | | | | | | | | 100 | 288 | |
| 8 | | | | | | | | | | 100 | | |
| 9 | | | | 150 | | | | | | | | 958 |
| 10 | 150 | 40.5 | | | | | | | | | | |
| 10a | | | | | | | | 150 | | | | 415 |

TABLE II—Continued

| No. | CaO | P₂O₅ | H₂SO₄ | CaSO₄ | NH₄HSO₄ | H₃PO₄ | NH₄H₂PO₄ | HNO₃ | NH₃ | capro-lactam | CHCl₃ | H₂O |
|---|---|---|---|---|---|---|---|---|---|---|---|---|
| 12 |  | 253 |  | 295 |  |  |  |  | 557 |  |  | 6306 |
| 13 |  | 103 |  | 116 |  |  |  |  | 226 |  |  | 2556 |
| 14 |  | 150 |  | 179 |  |  |  |  | 331 |  |  | 3750 |
| 15 |  | 150 |  | 29 |  |  |  |  | 54 |  |  | 850 |
| 16 |  |  |  |  |  | 150 |  |  | 277 |  |  | 2900 |
| 17 |  |  |  |  |  | 69 |  |  | 127 |  |  | 1325 |
| 18 |  |  |  |  |  | 81 |  |  | 150 |  |  | 1572 |
| 19 |  |  |  |  |  | 29 |  |  | 54 |  |  | 1020 |
| 20 |  |  |  |  |  |  |  | 81 | 150 |  |  | 1572 |
| 21 |  |  |  |  |  |  |  |  |  |  |  | 950 |
| 22 |  | 150 |  |  |  |  |  |  |  |  |  |  |
| 24 |  |  |  |  |  |  |  |  |  | 81 |  | 780 |

What is claimed is:

1. A process for the recovery of lactams from a Beckmann rearrangement reaction mixture of lactams and concentrated sulphuric acid or sulphur trioxide, with the by-production of nitrophosphate fertilizers or ammonium or alkali metal dihydrogen phosphate, said process comprising
    a. partially neutralizing the mixture of lactams and sulphuric acid or sulphur trioxide by the addition of at least one ammonium or alkali metal hydroxide, sulphate or carbonate, to form an ammonium and/or alkali metal sulphate, wherein the molar ratio of said sulphate to the sum of said sulphate and free sulphuric acid in the partially neutralized mixture is at least 1/8:1, and thereafter extracting said lactam from the partially neutralized solution with a substantially water-immiscible organic lactam solvent to recover lactam and to produce a solution of said sulphate and free sulphuric acid which is substantially lactam-free, and
    b. decomposing rock phosphate with a phosphoric acid containing solution to produce a rock phosphate decomposition mass,
    precipitating gypsum from said rock phosphate decomposition mass by the addition of said lactam-free solution of sulphate and sulphuric acid obtained in step (a) to form a solution containing free phosphoric acid and gypsum,
    separating gypsum from said solution containing free phosphoric acid, and
    thereafter neutralizing said solution containing free phosphoric acid with ammonia or alkali metal hydroxide, carbonate or sulphate to produce a phosphate containing solution, and
    thereafter recovering said phosphate in substantially solid form, suitable for use as a fertilizer.

2. Process according to claim 1, wherein the molar ratio of said sulphate to the sum of said sulphate and sulphuric acid in the mixture which is to be extracted in step (a) is between 1/8:1 and 1/5:1.

3. Process according to claim 2, wherein said extraction is at a temperature below 40°C.

4. Process according to claim 3, wherein said extraction temperature is below 30°C.

5. Process according to claim 3, wherein said solvent is chloroform.

6. Process according to claim 2, wherein the neutralized solution produced in step (b) consists essentially of ammonium dihydrogen phosphate or alkali metal dihydrogen phosphate.

7. Process according to claim 2, wherein an ammonium compound is used in the neutralization of step (a) and in the neutralization of step (b).

8. Process according to claim 7, wherein said ammonium compound is ammonium hydroxide.

9. Process according to claim 1, wherein the mixture of lactams and sulphuric acid or sulphur trioxide is partially neutralized in step (a) to a molar ratio of sulphate to the sum of sulphate and free sulphuric acid of at least 1/5:1, and wherein the rock phosphate is decomposed with said phosphoric acid containing solution and with from 0.5 to 1.5 moles of nitric acid per mole of phosphoric acid, and wherein the phosphate containing solution obtained from the neutralization in step (b) contains a nitrophosphate fertilizer product which is recovered in substantially solid form.

10. Process according to claim 9, wherein the mixture of lactams and sulphuric acid or sulphur trioxide is partially neutralized by the addition of an ammonium compound to form ammonium sulphate, wherein the molar ratio of ammonium sulphate to sulphuric acid is 0.9:1 to 1.1:1.

11. Process according to claim 9, wherein said process is utilized to prepare nitrophosphates having a N-P₂O₅ weight ratio of about 1:1, by controlling the decomposition of said rock phosphate with nitric acid and phosphoric acid to produce the resulting rock phosphate decomposition mass contains about 1 mole of calcium monophosphate per mole of calcium nitrate, in such a quantity that, when mixed with acid solution of sulphate and free sulphuric acid produced in step (a), the resulting solution, after removal of gypsum, contains about 2 moles of ammonium nitrate per mole of phosphoric acid, which solution is then subjected to said neutralization of step (b), with the production of a nitrophosphate suitable for use, after recovery in substantially solid form, as a fertilizer.

12. Process according to claim 11, wherein a potassium salt is added to the neutralized solution, whereby the resulting nitrophosphate fertilizer contains potassium.

13. Process according to claim 12, wherein the amount of potassium salt added is an equimolar amount, based on the amount of a phosphorous in said solution, whereby the resulting NPK fertilizer contains equal amounts by weight of nitrogen (N), phosphorous (P₂O₅) and potassium (K₂O).

* * * * *